MARTIN C. HENDERSON
NORTON B. BUCK
INVENTORS

BY Allen M. Sutton

ATTORNEY

Jan. 16, 1968 M. C. HENDERSON ET AL 3,364,479
LINE DRAWING SYSTEM
Filed July 31, 1963 5 Sheets-Sheet 2
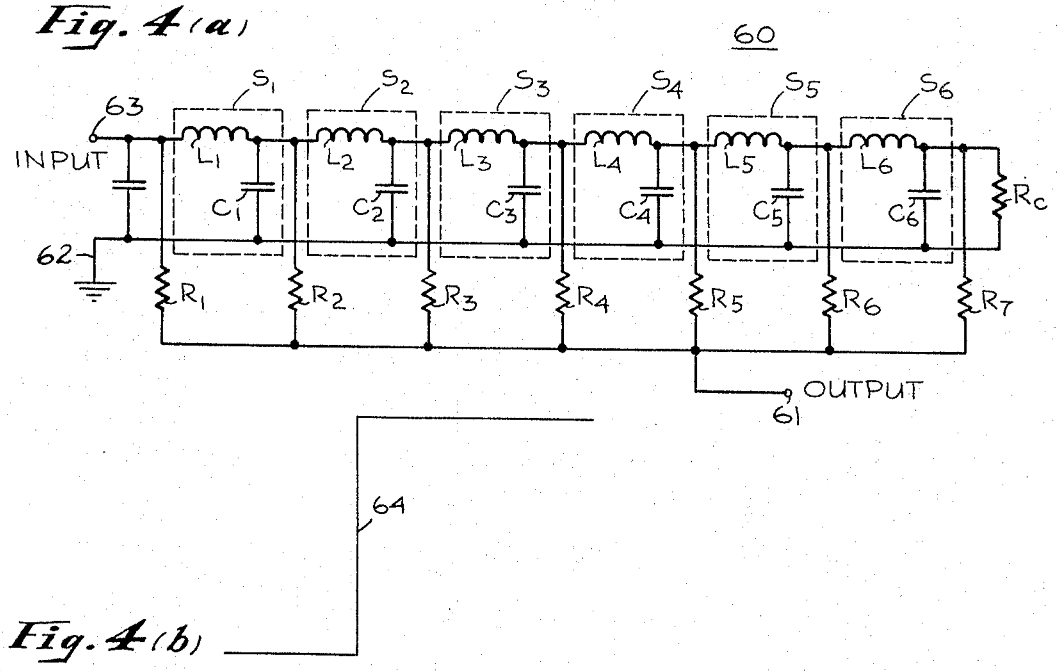
Fig. 4(a), Fig. 4(b)
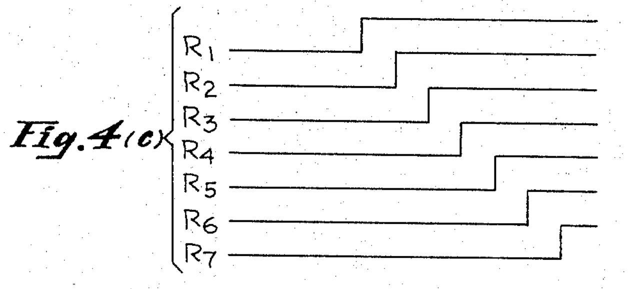
Fig. 4(c)
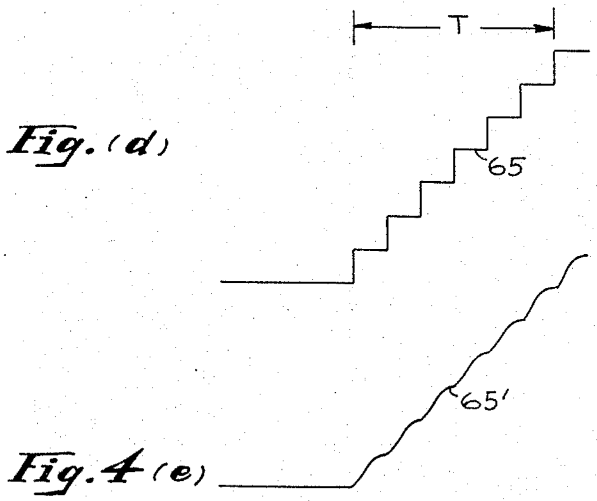
Fig. (d), Fig. 4(e)
MARTIN C. HENDERSON
NORTON B. BUCK
INVENTORS
BY Allen M Sutton
ATTORNEY

MARTIN C. HENDERSON
NORTON B. BUCK
INVENTORS

BY Allen M. Sutton
ATTORNEY

MARTIN C. HENDERSON
NORTON B. BUCK
INVENTORS

BY Allen M. Sutton
ATTORNEY

INVENTORS
MARTIN C. HENDERSON
NORTON B. BUCK
BY
Allen M. Sutton
ATTORNEY

United States Patent Office 3,364,479
Patented Jan. 16, 1968

3,364,479
LINE DRAWING SYSTEM
Martin C. Henderson, Canoga Park, and Norton B. Buck, Pacific Palisades, Calif., assignors, by mesne assignments, to The Bunker-Ramo Corporation, Stamford, Conn., a corporation of Delaware
Filed July 31, 1963, Ser. No. 298,881
15 Claims. (Cl. 340—324)

ABSTRACT OF THE DISCLOSURE

An apparatus for deflecting a cathode ray tube beam along a straight line between two end points defined by vertical and horizontal coordinates. The apparatus includes first and second delay line means respectively responsive to horizontal and vertical step input signals. The delay lines respectively develop horizontal and vertical deflection signals of a character causing the beam to have equal horizontal and vertical transition times regardless of the magnitude of transition. The deflection signals are developed by applying the input signals to tapped delay lines and summing the signal components appearing on the taps.

This invention relates to line drawing systems and, more particularly, to an improved system for automatically drawing straight lines by electronic means.

For many years data has been presented in the form of graphs, using various coordinate systems, to enable users to easily comprehend and evaluate the data. Such graphs have generally been laboriously constructed by hand. In recent years, however, with the advent of high speed computing equipment capable of providing tremendous amounts of data virtually instantaneously, efforts have been directed toward providing means for automatic plotting at high speed.

At present, various automatic plotters are commercially available. These machines are capable of sensing data supplied to them and converting such data to a graph composed of points which are then interconnected to form desired configurations. For example, X–Y plotters are but one type of machine for performing the described plotting operation. Another instrument used for display purposes is the cathode ray tube (CRT), which is similar to the well known television tube, wherein electrical signals cause an electron beam within the display tube to be deflected to different positions on a phosphor-coated display surface of the tube. It is possible to supply the display tube with electrical signals which are proportional to X and Y numerical values (in a rectangular coordinate system), so that the electron beam will be deflected to a point on the display surface having a horizontal displacement of X and a vertical displacement of Y with respect to predetermined lines of reference. Of course, by changing the electrical signals to be proportional to new numerical values X′ and Y′, the beam will be deflected to a second point as represented by the second set of coordinates. Such automatic point plotting technique is similarly well known in the electronic information display art.

Quite often, the desired automatically plotted configuration is to be composed of straight lines rather than single individual points and the plotting of straight lines has heretofore required complex electronic equipment which, despite its cost, does not maintain a high degree of plotting accuracy. The reasons for such complexity become apparent when considering a straight line as composed of an infinite number of points between the two end points of the line. Of course, if sufficient electrical signals changing by infinitely small amounts are available, then it is possible to draw straight lines automatically with conventional cathode ray display tubes in a manner similar to the drawing of a series of individual points. However, such is not usually the case, and in fact, it is usually desired to limit the number of signals necessary to define and consequently plot a straight line. In manual operation, a draftsman needs only to know the end coordinates of a line and after locating the two end points a straightedge may be used to connect the two points to form the desired line. Such a simple technique of drawing a straight line by defining the two end coordinates only is highly desirable in automatic line drawing methods utilizing cathode ray tubes, since the number of electrical signals necessary to deflect the electron beam in a straight line will thus be held to a minimum. This is particularly true where the electrical signals are converted from digital numbers which have been prestored in a computer of a limited storage capacity, since the fewer the digital numbers necessary to define a straight line, the more lines may be stored in the computer's information storage section. However, past experience with available automatic drawing equipment using cathode ray tubes for display has shown that when deflecting the electron beam to a first point on its display surface defining one end point of the line, and then deflecting the beam by supplying signals representing the coordinates of the other end point of the line, the beam does not always move in a straight line between the two end coordinates, but rather tends to follow undesired courses between the two end points.

Accordingly, it is an object of the present invention to provide a system which greatly simplifies the equipment and circuitry necessary for automatic straight line drawing from digitally stored computer information.

It is another object of the present invention to provide a system which greatly simplifies the equipment and circuitry necessary for automatic straight line drawing from digital information representing only the end points of each line to be drawn.

The present invention involves wave shaping circuits including tapped delay lines of selected characteristics which are energized by analog input signals having step function waveforms which represent the two end points of a line to be drawn. The circuits shape the analog input signals by introducing rise times in them, thereby providing deflection signals with controllable rates of change so that the electron beam of the display tube is deflected in a straight line between its two end positions at an optimum speed chosen from a plurality of available speeds.

A system embodying the present invention may incorporate a digital computer, wherein information defining the coordinates of the two end points of each line to be automatically drawn has been stored. Assume that, on command, the computer provides a set of two digital numbers which define the coordinates of one end of a given line. Each of the two numbers is then converted in a digital-to-analog converter to an analog voltage or current signal, in a manner well known by those versed in the arts of computer operations and information display. The two signals may be utilized to energize the horizontal and vertical deflection circuits of a display tube such as a cathode ray tube, so that the electron beam of the tube is deflected and positioned at a point on the display surface which corresponds to the coordinates defined by the two digital numbers produced by the computer. When the computer produces a second set of two digital numbers, which define the coordinates of the other end of the line to be drawn, the digital-to-analog converters will produce two new analog signals which are related to the new set of digital numbers, the change in output signal of each converter being in the form of a step function, the height of the step depending on the difference between the numbers in the first and second sets of digital numbers supplied to the converter. If these output signals of the converters in the form of step functions were directly used to energize the horizontal and vertical deflection circuits of the display tube, the deflection circuits would become saturated, as will be explained hereafter, so that the electron beam would not move in a straight line between the two points defined by the two sets of end coordinates. Rather, the beam would first tend to be deflected from the point defined by the coordinates of the first set of signals by first forming a slope of forty-five degrees with both the horizontal and vertical axes of the display surface, and, after the horizontal or vertical component of the second set of end coordinates had been reached, the beam would tend to approach the point defined by the second set of coordinates in either a straight horizontal or vertical direction, so that two lines are drawn between the two sets of end coordinates rather than the single desired straight line.

However, apparatus embodying the present invention prevents the foregoing phenomenon from occurring by incorporating wave-shaping circuits which modify the step or square wave output signals of the digital-to-analog converters to provide signals which are used to energize the horizontal and vertical deflection circuits of the display tube. The wave shaping circuits are so designed as to prevent the deflection circuits from saturating. The wave shaping circuits further control the input signals to both deflection circuits so that the ratios between step signal increments produced by the digital-to-analog converters and the corresponding deflection signal increments supplied to the deflection circuits are substantially equal at all times. By so controlling the deflection signals which energize the deflection circuits, the apparatus positions the electron beam of the display tube at a point on the display surface determined by a first set of digital numbers, and then causes the beam to deflect in a single straight line toward a second point defined by a second set of digital numbers.

The novel features which are believed to be characteristic of the invention, both as to the system and method of line drawing, together with further objects and advantages thereof, will be better understood from the following description taken in conjunction with the accompanying drawings, in which.

Figure 3A:
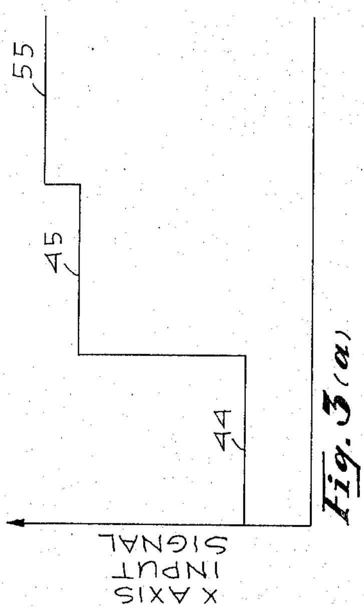
Figure 3B:
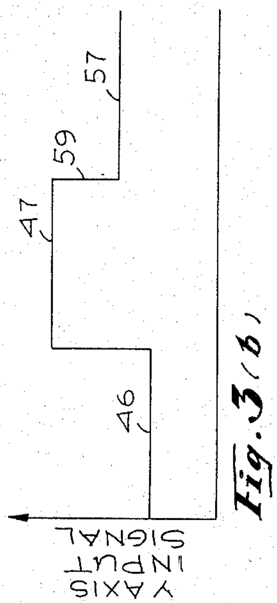
Figure 5A:
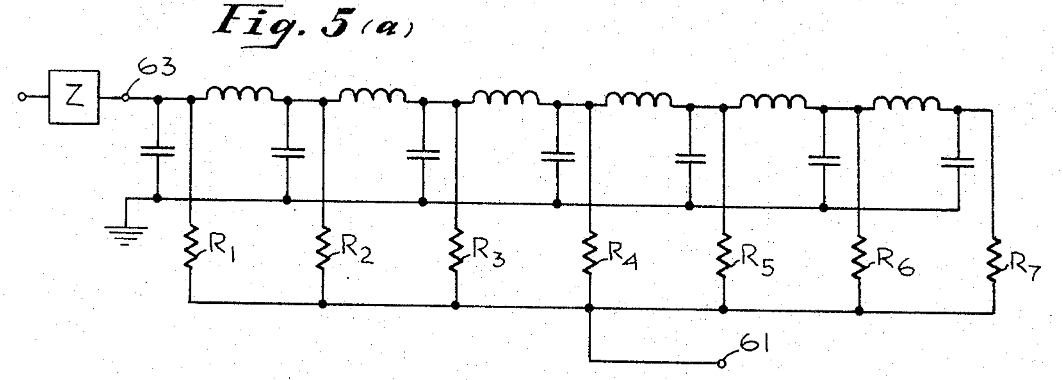
Figure 5B:
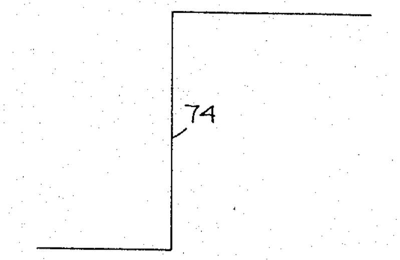
Figure 5C:
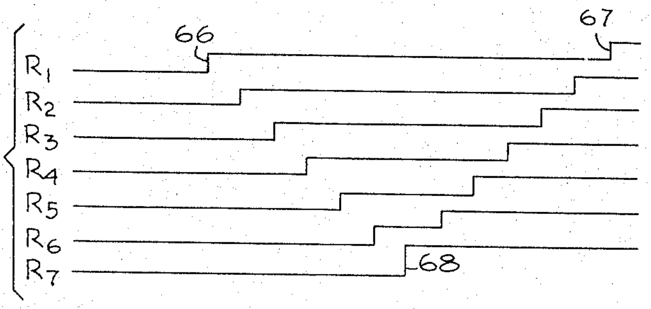
Figure 5D:
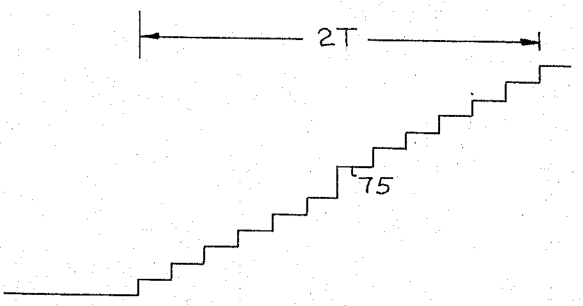
Figure 6A:
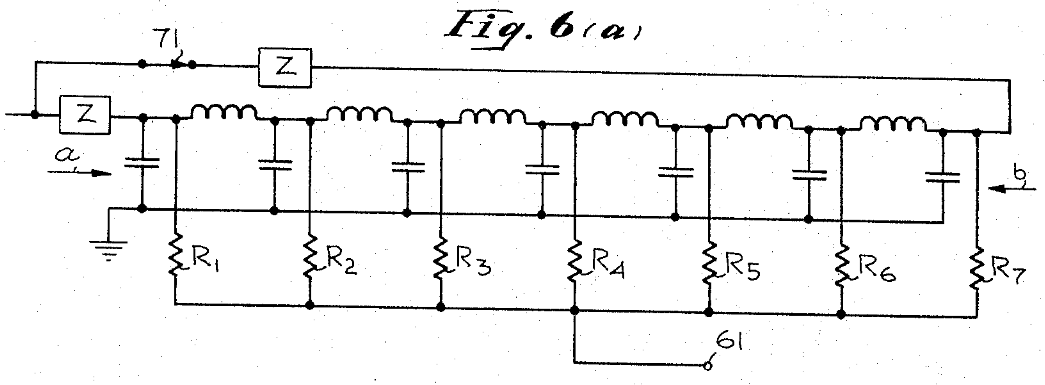
Figure 6B:
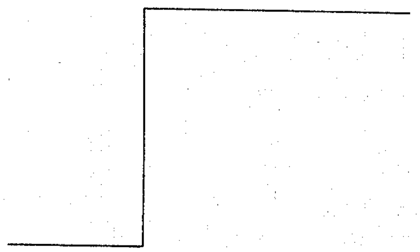
Figure 6C:
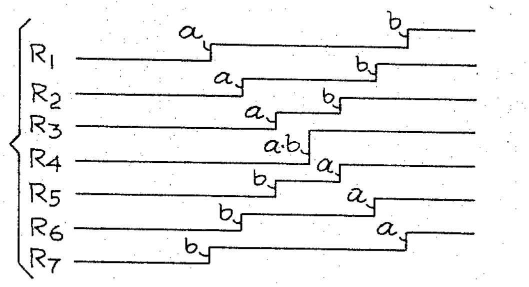
Figure 6D:
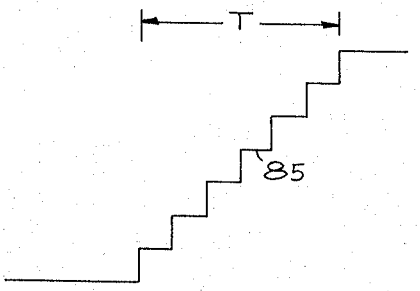
Figure 7A:
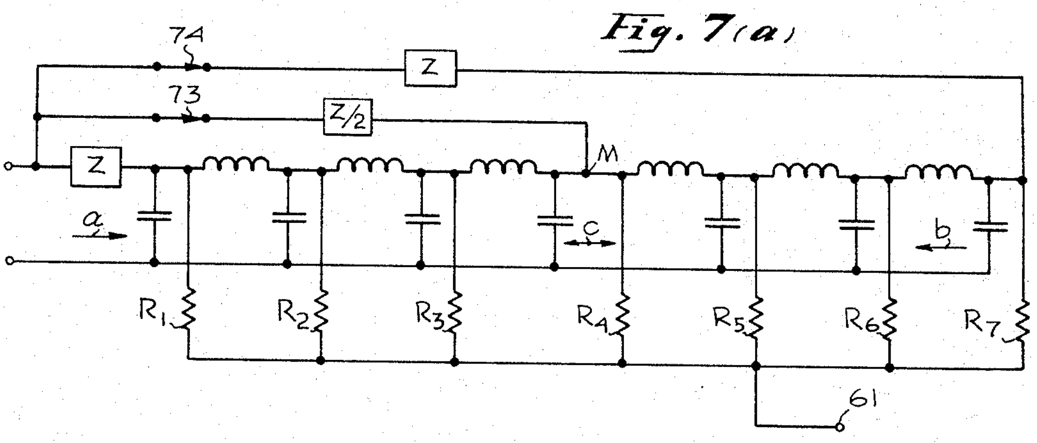
Figure 7B:
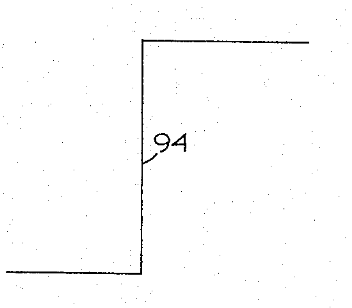
Figure 7D:
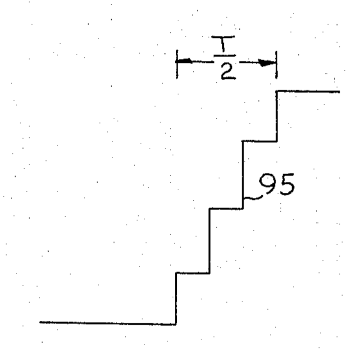
Figure 7C:
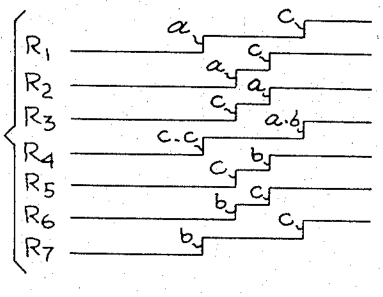
Figure 8:
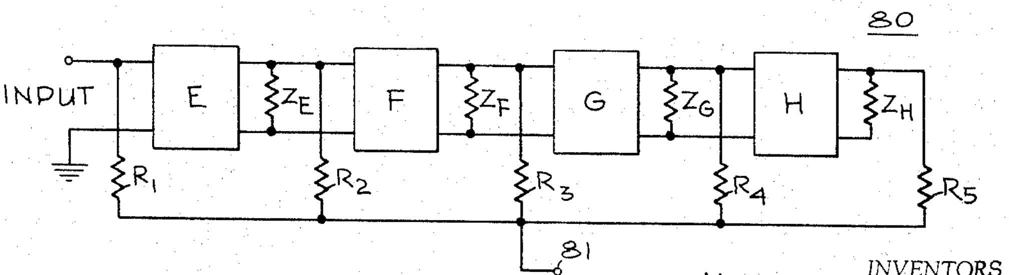

FIGS. 3(*a*) and 3(*b*) represent signal waveforms useful in understanding the system of the invention;

FIGS. 4(*a*)–4(*e*), 5(*a*)–5(*d*), 6(*a*)–6(*d*), and 7(*a*)–7(*d*) are schematic diagrams of various embodiments of the invention along with waveforms useful in understanding the invention; and FIG. 8 is a block diagram of still another embodiment of the invention.

Figure 1:
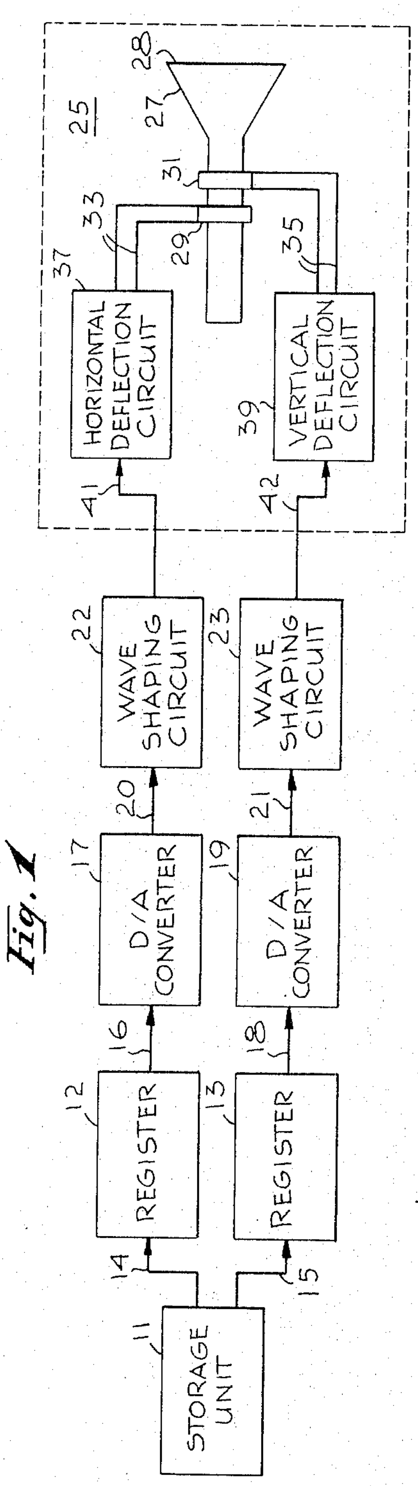
FIGURE 1 is a block diagram of one embodiment of the present invention.

Referring now to the embodiment of the invention shown in FIG. 1, a digital storage unit 11 is connected to digital registers 12 and 13, through lines 14 and 15 respectively. The digital storage unit 11 may be a digital computer, but is not limited thereto, wherein the coordinates of the points of lines to be automatically drawn are stored in memory of storage sections. Any digital circuit operable to supply the registers 12 and 13 with digital numbers defining such coordinates may be employed as the storage unit 11. The digital registers 12 and 13 are of sufficient bit capacity to register the largest possible numbers that may have been stored in the storage circuit 11. For example, a ten bit register will suffice if the largest number to be registered therein does not exceed 1024. For explanatory purposes only, it will be assumed that ten bit registers are sufficient and that the digital numbers supplied to the registers 12 and 13 by storage circuit 11 represent the horizontal and vertical components, respectively, of the coordinates of end points of lines in a rectangular Cartesian coordinate system. The digital number representing the horizontal coordinate component of an end point of a line is in turn supplied by register 12 through line 16 to a conventional digital-to-analog converter 17, while the digital number representing the vertical coordinate component of the same end point is supplied by the register 13 through line 18 to another similar digital-to-analog converter 19. The outputs of the analog converters 17 and 19 in the form of step functions, the heights of the steps being proportional to the changes of the energizing digital signals, are supplied through lines 20 and 21 to wave shaping circuits 22 and 23, respectively.

A display system, generally designated by numeral 25, serves as the means for displaying the lines which are automatically drawn. The display system 25 comprises a display tube 27 (such as a cathode ray tube) with its associated circuitry which operates in a fashion similar to a television tube, having a viewing or display surface 28. Horizontal and vertical deflection coils, which serve to deflect an electron beam within the tube 27, are designated by numerals 29 and 31, respectively, and are respectively connected by means of lines 33 and 35 to a horizontal deflection circuit 37 and to a vertical deflection circuit 39. The deflection circuit 37 is further connected to the wave shaping circuit 22 through line 41, while the deflecting circuit 39 is connected through line 42 to the wave shaping circuit 23. While electromagnetic deflection means are shown for purpose of illustration, it is to be understood that the display tube 27 might use electrostatic deflection means and the invention is not limited to one or the other.

Figure 2:
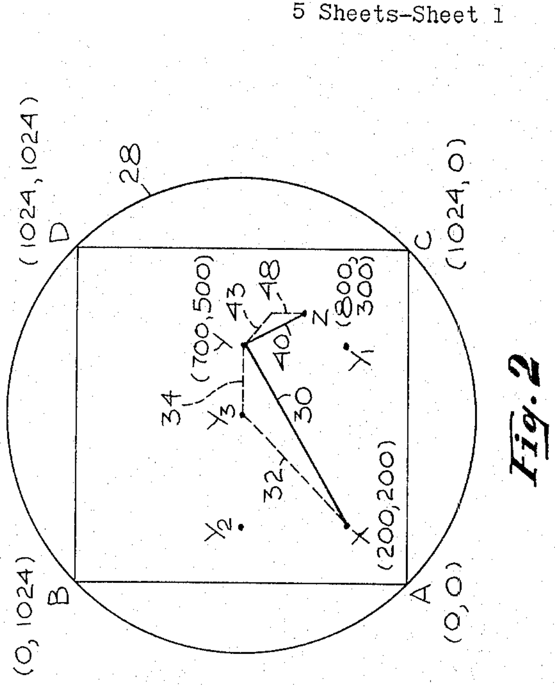
FIG. 2 is a diagrammatic front view of a display apparatus that may be used to display line configurations automatically drawn according to the teaching of the invention.

The manner of operation of the system shown in FIG. 1 may best be explained by referring to FIGS. 2 and 3. In FIG. 2, a front view of the display surface 28 of the display tube 27 is diagrammatically shown. As it was previously assumed that the largest number in the system representing a coordinate component of a point to be drawn is 1024, it is further assumed that the dislay surface 28 is dimensionally large enough both in its horizontal and vertical dimensions to permit the electron beam of the tube to be deflected a distance which is proportional to that largest coordinate number. In FIG. 2, a point designated "A" represents a position on the surface to which the display beam is deflected if the digital content of the registers 12 and 13 is zero in both registers. Point B represents a zero digital number in the register 12 and a maximum digital number, namely 1024, in the register 13. Point C, on the other hand, represents a maximum digital number in the register 12 and a zero number in register 13, Point D, which is the farthest corner of a maximum square display surface, superimposed on the circular display surface 28, represents a point having maximum coordinate components in both the horizontal and vertical directions.

Let it be assumed that the storage unit 11 has first supplied two digital numbers, each being 200 and representing the coordinates of a first end point of a line, which in turn have caused the electron beam of the display tube 27 to be deflected to point X which is the first end point of a straight line 30 as shown in FIG. 2. The output levels of the converters 17 and 19 are designated as lines 44 and 46 as shown in FIGS. 3(*a*) and 3(*b*), respectively. Assume now that the storage unit 11 automatically supplies a new set of numbers, which represent the coordinates of the second end point of the straight line 30 which is to be automatically drawn, the number supplied by the storage unit 11 to the register 12 being 700, representing the horizontal component of the coordinates of the second end point of the line 30, and the number supplied to the register 13 being 500, representing the vertical component of the coordinates of the latter end point. The register 12 will energize the converter 17 so that its output will change to represent 700 as shown by line 45 in FIG. 3(*a*). The register 13 will similarly energize the converter 18 so that its output signal will change to represent 500, as shown by line 47 in FIG. 3(*b*).

The importance and function of the wave shaping circuits 22 and 23 can best be appreciated by considering the operation of the system in their absence. If the signals as represented by lines 45 and 47 in FIGS. 3(*a*) and 3(*b*), respectively, were directly supplied to the deflection circuits 37 and 39, the electron beam of the display tube 27 would not be deflected from point X to point Y along straight line 30, as shown in FIG. 2, but rather would follow a path as shown by dashed lines 32 and 34. Line 32 forms a forty-five degree angle with respect to both the horizontal and vertical axes of the coordinate system of the display surface. The reason for the electron beam of the display tube 27 following the indirect path of the lines 32 and 34 between the points X and Y can be explained by observing the step functions shown in FIGS. 3(*a*) and 3(*b*). As shown in FIG. 3(*a*), the sudden change in the output signal of the converter 17 from level 44 to level 45 saturates the conventional deflection circuit 37 of the display tube so that the electron beam tends to be deflected in a straight horizontal direction towards point $Y_1$ of FIG. 2, having a horizontal coordinate component of 700. At the same time, the sudden change in the output signal of the converter 19 from the level 46 to level 47 saturates the conventional deflection circuit 39 so that the electron beam tends to be deflected in a straight vertical direction toward point $Y_2$ of FIG. 2, having a vertical coordinate component of 500. The electron beam which is simultaneously being subjected to forces tending to deflect it in both horizontal and vertical directions chooses an intermediate path along line 32 which substantially forms a forty-five degree angle with both the horizontal and vertical axes. The electron beam continues to be deflected along line 32 forming a forty-five degree angle with both axes, until one of the coordinate components of the point towards which the beam ultimately tends to be deflected is reached. The electron beam then follows either a direct horizontal or vertical deflection course toward the end point. In the example shown, the vertical coordinate component of point Y, namely 500, is reached at point $Y_3$, so that from $Y_3$ towards ultimate point Y the beam is deflected in a horizontal direction along dashed line 34.

A similar phenomenon occurs when the output signal of the converter 17 increases to a level representing 800 and the output signal of the converter 19 drops to a level representing 300, both output signals representing a point Z having horizontal and vertical coordinate values of 800 and 300, respectively. The electron beam, instead of being deflected along line 40 as desired, will first be deflected along dotted line 43 and then move vertically downward along line 48 towards end point Z.

However, according to the teachings of the invention, the waveforms of the output signals of the converters 17 and 19 are shaped in the wave shaping circuits 22 and 23 by introducing predetermined controllable rise times in the output signals. Thus, the signals energizing the deflection circuits 37 and 39 do not saturate those circuits, but rather control the deflection signals so that the electron beam is deflected in substantially direct straight paths between the end points X and Y, as indicated by line 30 (FIG. 2) and between the end points Y and Z, as indicated by line 40.

In accordance with the present invention, each of the wave shaping circuits 22 and 23, shown in FIG. 1, comprises a delay line, generally designated by numeral 60, as shown in FIG. 4(*a*). The delay line comprises a number of sections which, for explanatory purposes only, are represented as six, designated as $S_1$ through $S_6$. As shown, the delay line 60 includes six serially connected, substantially equal value, inductors, designated $L_1$–$L_6$, and six substantially equal value capacitors, designated $C_1$–$C_6$. One side of each capacitor is connected to a common grounded lead 62, and the other side of each capacitor $C_1$–$C_5$ is connected to a junction point between two inductors, with the other side of capacitor $C_6$ connected to the far side of inductor $L_6$. Each delay line section comprises one inductor L and one capacitor C with sampling resistors $R_2$ through $R_6$ connected to the junction points between inductors $L_1$ through $L_6$, respectively. One end of a sampling resistor $R_1$ is connected to an input terminal 63 to which the inductor $L_1$ is also connected. Another sampling resistor $R_7$ has one end connected to the far side of inductor $L_6$. The opposite ends of the resistors $R_1$ through $R_7$, which resistors may all be of substantially equal value, are connected to an output terminal 61. The relative values of the resistors $R_1$ through $R_7$ control the over-all rise time linearity of the signal at the output terminal 61, the linearity selected being dependent on response characteristics of other circuits in the system, such as the deflection circuits 24 and 25 (FIG. 1). In the embodiment of the invention shown in FIG. 4(*a*), the delay line 60 is terminated in its characteristic resistance, designated as $R_c$, so that any wave propagated down the delay line from input terminals 62, 63, terminates therein and is not reflected. With an input signal having step function characteristics, as shown by a line 64 in FIG. 4(*b*), introduced at the input terminals 62 and 63, the signal propagates through the delay line with each sampling resistor contributing an increment of signal change to the output signal. FIG. 4(*c*) represents the individual output signal contributions of each of the sampling resistors $R_1$–$R_7$. As shown therein, the contributions of the various sampling resistors are equal in amplitude, since, as assumed above, all the resistors are equal. Further, the time delays between contributing output increments are the same since it is assumed that all the inductors L are of identical values and, similarly, the capacitors C are identical, resulting in equal incremental time delays produced by each of the substantially identical sections of the delay line 60.

In FIG. 4(*d*) a line, generally designated by numeral 65, represents the total output signal at terminal 61 as a function of an input step function signal 64, as shown in FIG. 4(*b*), the total rise time being equal to the total time delay T of the delay line 60. It is apparent to those familiar in the art that each incremental output step contributed by each sampling resistor will not be in practice a sharp step function as shown in FIGS. 4(*c*) and 4(*d*), but rather will have its own incremental rise time which is a function of the characteristics of each delay line section, the true output signal more closely resembling the signal shown in FIG. 4(*e*). The incremental rise times may effectively blend the steps together thereby shaping the input step function signal of FIG. 4(*b*) to approach a straight line 65′, as shown in FIG. 4(*e*), so that when such signals are supplied to deflection circuits 37 and 39 (FIG. 1), the deflection circuits do not saturate but rather deflect the beam in a desired straight line as explained above.

Although in the embodiments shown and described herein, the output of the delay line is an increasing signal, it is apparent that it can be a decreasing signal if the input signal decreases rather than increases.

In the described embodiment of the invention, the total rise time of the input step function signal (FIG. 4(*b*)) which is virtually instantaneous, is converted to the total time delay T of the delay line 60, as shown in FIG. 4(*d*). Yet, in another embodiment of the invention schematically represented in FIG. 5(*a*), the total rise time of the input step function signal may be converted to twice the time delay of the delay line incorporated therein.

As shown in FIG. 5(*a*), a tapped delay line 60, substantially identical to the one previously described, is incorporated in each of the wave shaping circuits 22 and 23 (FIG. 1). However, in the present embodiment, the delay line 60 is driven by an input step function signal 74, as shown in FIG. 5(*b*), from a source having an impedance Z equal to the characteristic impedance of the delay line, and the other end of the line is open except for the sampling resistor $R_7$ connected thereto. As is well known in the art, a signal transmitted through such a delay line will propagate from the input end at terminal 63 towards the open end of the line, and then be reflected and travel back towards the input end of the line.

Referring now to FIG. 5(*c*), there are shown the individual contributions of the sampling resistors $R_1$ through $R_7$ to the output signal, in response to an input signal 74 (FIG. 5(*b*)) propagating through a delay line 60 as shown in FIG. 5(*a*). For example, the contribution of sampling resistor $R_1$ to the output signal is represented by incremental signal increases 66 and 67. The incremental signal 66 is shown to be in time phase relationship with the input step function signal of FIG. 5(*b*), resulting from the input signal starting to travel through the delay line, without being delayed as yet. However, the incremental signal 67 is contributed by $R_1$ as the input signal propagates towards the input end of the delay line after having been delayed by time T while traveling towards the open end of the line, and being delayed by an additional time T while traveling from the open end to the input end of the line. The total delay time which is equal to time 2T is diagrammatically indicated in FIG. 5(*d*) by line 75 which represents the total output signal at terminal 61. It should be noted that the incremental signal contribution of $R_7$ designated by numeral 68 (FIG. 5(*c*)) is equal to twice the individual incremental signal contributions of the other sampling resistors. This phenomenon is present since the signal contribution 68 occurs because of the propagating signal having reached the end of the delay line and coincidently in time being reflected back towards the input end. In practice, the value of $R_7$ is therefore chosen to be substantially double the values of the other sampling resistors so that all the individual output contributions are equal, resulting in an output signal which increases substantially linearly with time.

In still another embodiment of the present invention, the open-ended delay line 60, described in the previous embodiment, is again utilized. However, in this embodiment, the tapped delay line 60 is driven from both ends from a signal source having an impedance Z equal to the characteristic impedance of the delay line, as shown in FIG. 6(*a*). The driving input signal to one end of the line may be disrupted by means of switch 71 which is shown in its closed position. By driving the delay line from both ends with an input step function signal 84 as shown in FIG. 6(*b*), the signals propagate in the line in opposite directions, as shown by arrows designated *a* and *b* (in FIGURE 6(*a*)). Referring to FIG. 6(*c*), there are shown the individual output signal contributions of each sampling resistor, each contribution of each resistor being designated by a letter *a* or *b*, respectively, dependent on the direction of propagation of the signal in the delay line responsible for the contribution. The total output signal with switch 71 closed is shown in FIG. 6(*d*) and is generally designated by numeral 85, having a rise time T equal to the time delay of the delay line. However, by opening the switch 71, the system reverts back to the one shown in FIGS. 5(*a*) through 5(*d*), wherein the total rise time of the output signal is equal to twice the time delay of the delay line. Thus, the position of the switch 71 (whether open or closed) determines the rise time of the output signal. Therefore, with appropriate mechanical or electronic switching, two different rise times may be attained, which enable the drawing of lines of differing lengths at appropriate line drawing speeds.

The number of different output signal rise times attainable may further be increased by an arrangement such as shown in FIG. 7(*a*), wherein the delay line is driven by an input step function signal 94 shown in FIG. 7(*b*) from three points, namely, from both ends of the line and from its middle. The midline driving input signal, as well as one of the end line driving input signals, may be disconnected by mechaniually or electronically actuated switches 73 and 74, respectively, to cause the system to revert to that shown in FIGS. 5 or 6. The midline driving input impedance is equal to one half the characteristic impedance Z of the delay line, while the end points are driven by an input impedance source which is equal to the delay line's characteristic impedance. The driving signals from the ends of the delay line propagate through the line in opposite directions *a* and *b* as shown in FIGURE 7(*a*), the signals terminating at the midpoint M. The midpoint driving signal, however, propagates in both directions as indicated by the arrows generally designated by the letter *c* towards the two end points, terminating therein. The individual incremental output contributions of the resistors $R_1$ through $R_7$ are shown in FIG. 7(*c*) with the individual contributions of each resistor designated by a letter respectively related to the propagation direction of the signal causing the incremental output signal to be generated therein. The total output signal contributed by all the sampling resistors is shown in FIG. 7(*d*), generally designated by numeral 95, a study of which makes it apparent that the total rise time of the output signal equals only one-half the total time delay of the delay line.

It should be apparent, therefore, that the system schematically represented in FIG. 7(*a*) may provide a choice of three different rise times of the output signal, thereby enabling the selection of different ones of three deflection speeds for drawing lines of different lengths. For example, with both switches 73 and 74 (FIG. 7(*a*)), which may be either electronically or mechanically operable, in the closed positions as shown, the output signal from the delay line has a rise time of $T/2$, while if only switch 74 is closed, the rise time is equal to T, as shown in FIG. 6(*d*), and with both switches open, the rise time equals 2T as shown in FIG. 5(*d*). It should further be clear that other driving means may be added, wherein the delay line is driven from intermediate points other than the midpoint only, thereby providing output signal rise times different from those already described.

The arrangement described above wherein output signals having different rise times may be produced with a single delay line of a predetermined number of sections is especially adaptable to fast electronic switching whereby the setting of the driving points from which the delay line is to be driven to produce a next output signal having a different rise time than a previous output signal may take place as soon as the delay line has been energized to produce the first output signal, without affecting its rise time. Such is not possible when output signals of different rise times are produced by using different delay lines, or using a finite line with a varying number of sections, since in the latter cases fast switching together of energized and unenergized delay line sections for producing the next output signal of a desired rise time may instantaneously affect the rise time of the previous output signal.

The output signals attainable in the different embodiments of the present invention as described have been generally diagrammed in FIGS. 4(*d*), 5(*d*), 6(*d*) and 7(*d*). Each of the output signals is represented as a series of incremental step functions. However, in light of the foregoing description in connection with FIG. 4(*e*), it should be apparent that in practice the incremental step functions exhibit individual rise times, so that the incremental step functions substantially blend together into a line having approximately a linear rise time, as shown in FIG. 4(*e*). Additional means may be incorporated to further blend the incremental step functions, including the beginning and end of each output signal, so that the output signals of the wave shaping circuits 22 and 23 (FIG. 1) may directly drive the display system 25 so that straight lines between their end coordinate points are displayed.

Although in the embodiments described above the delay lines are shown as comprising inductive-capacitive sections, it is apparent that other types of multisection delay lines may equally well be used and their incorporation in this invention is contemplated.

In still another embodiment of the present invention, each of the wave shaping circuits 22 and 23 comprises a tapped delay line 80, as shown in FIG. 8. The delay line 80 comprises four sections shown for explanatory purposes only, it being clear that any number of sections may be selected. The sections are generally designated E, F, G, H, having different characteristic impedances, with sampling resistors $R_1$ through $R_5$ connected to the input and output junctions of all the sections. The other leads of all the resistors are connected to an output terminal 81. The sections are arranged with ascending characteristic impedances, the sections terminating in their characteristic impedances. The terminating characteristic impedance of each section may comprise the impedance of the following section in combination with the sampling resistor only, or it may include additional resistors designated $Z_E$, $Z_F$, $Z_G$ and $Z_H$. The delay line 80, except for the different characteristic impedances of its section, functions in a manner similar to those delay lines previously described and, therefore, the description will not be repeated. Although the construction of a delay line, such as the line 80, requires components of a variety of values, such a line may be selected in order to obtain greater performance efficiency, where a larger output current is attained for a given input power as compared with the output current attainable with a delay line of identical sections such as previously described.

From the foregoing description, it is now apparent that the present invention provides an improved system for automatically displaying lines on a display surface, the display surface of a cathode ray tube being one example of such surface, from signals derived from digital information representing the coordinates of the end points of the displayed lines, the lines being substantially straight between their end points. Although embodiments of the invention utilizing cathode ray tubes have been shown and described, it will be appreciated that the invention is not so limited, but may be utilized to provide smoothly changing control signals to other devices as well.

It is understood that many changes and modifications may be made by one skilled in the art without departing from the true spirit and scope of the invention.

The embodiments of the invention in which an exclusive property or privilege is claimed are defined as follows:

1. A system for displaying a substantially straight line between two end points in a plural coordinate system comprising:

means for providing digital signals representing said end points with respect to first and second coordinates;

converter means for receiving said digital signals and providing first and second step function electrical signals respectively representing first and second coordinates of said end points;

first and second delay line means connected to respectively receive said first and second step function signals and provide corresponding first and second output signals whose amplitudes change from level to level in accordance with said step function signals in a same selected length of time regardless of the amplitude of the change; and display means connected to receive said first and second output signals for displaying a line drawn in accordance therewith.

2. The improvement defined by claim 1, wherein said delay means comprise two substantially identical, passive tapped delay lines.

3. A system for displaying a substantially straight line between two end points in a plural coordinate system comprising:

means for providing digital signals representing said end points with respect to first and second coordinates;

converter means for receiving said digital signals and providing first and second step function electrical signals having increments respectively representing changes with respect to said first and second coordinates;

first and second delay line means connected to respectively receive said first and second step function signals and provide corresponding first and second output signals whose amplitudes change by amounts corresponding to the increments in said step function signals, ratios between said first and second step function signal increments and corresponding first and second output signal amplitudes being substantially equal at all times; and display means connected to receive said first and second output signals for displaying a line drawn in accordance therewith.

4. The improvement defined by claim 3, wherein said delay means comprise two substantially identical, passive tapped delay lines.

5. The improvement defined by claim 4, wherein each of said tapped delay lines comprises a preselected number of sections, said lines being driven from one end by said first and second step function signals respectively, their other ends terminating in their respective characteristic impedances so that said selected predetermined length of time substantially equals the total time delay of each delay line.

6. The improvement defined by claim 4, wherein each of said tapped delay lines comprises a preselected number of sections, said lines being open ended and driven from one end by said first and second step function signals respectively from signal sources whose output impedances substantially equal the characteristic impedances of said delay lines, said selected predetermined length of time being substantially equal to twice the time delay of each of said delay lines.

7. The improvement defined by claim 4, wherein each of said tapped delay lines comprises a preselected number of sections, said lines being open ended and driven from both ends by said first and second step function signals respectively from signal sources whose output impedances substantially equal the characteristic impedances of said delay lines, said selected predetermined length of time being substantially equal to the time delay of each of said delay lines.

8. The improvement defined by claim 4, wherein each of said tapped delay lines comprises a preselected number of sections, said lines being open ended and being selectively driven by said first and second step function signals respectively from at least one of a plurality of points, said points including end points of said lines and junction points between any two sections thereof.

9. Apparatus for use in combination with a scriber deflection means for deflecting a scriber along a substantially straight line between a first point defined by first horizontal and vertical analog signal levels and a second point defined by second horizontal and vertical analog signal levels, said apparatus including:

a first waveshaping means having an input terminal and an output terminal and responsive to a transition in signal level applied to said input terminal for producing a signal level transition of a predetermined duration at said output terminal;

said first waveshaping means comprising a delay line connected to said first waveshaping means input terminal and a plurality of taps each connecting a different point along said delay line to said first waveshaping means output terminal;

a second waveshaping means having an input terminal and an output terminal and responsive to a transition in signal level applied to said input terminal for producing a signal level transition of a predetermined duration at said output terminal;

said second waveshaping means comprising a delay line connected to said second waveshaping means input terminal and a plurality of taps each connecting a different point along said delay line to said second waveshaping means output terminal;

means for successively applying said first and second horizontal analog signal levels to said first waveshaping means input terminal; and means for successively applying said first and second vertical analog signal levels to said second waveshaping means input terminal.

10. The apparatus of claim 9 wherein said first and second waveshaping means are substantially identical.

11. The apparatus of claim 9 wherein said taps are equally spaced along said delay line.

12. The apparatus of claim 9 wherein each of said delay lines is terminated in its characteristic impedance.

13. The apparatus of claim 9 wherein each of said delay lines is terminated in an open circuit.

14. The apparatus of claim 9 wherein each of said delay lines has first and second ends; and means connecting the input terminal of each of said waveshaping means to the first and second ends of the delay line thereof.

15. The apparatus of claim 9 including means for connecting the input terminal of each of said waveshaping means to spaced points along the delay line thereof.

References Cited

UNITED STATES PATENTS

| | | | |
|---|---|---|---|
| 3,153,207 | 10/1964 | Brown | 333—19 X |
| 3,289,195 | 11/1966 | Townsend | 340—324 |
| 3,001,137 | 9/1961 | Kassel et al. | 328—56 |
| 3,027,468 | 3/1962 | Hill et al. | 328—56 |

THOMAS B. HABECKER, *Acting Primary Examiner.*

NEIL C. READ, *Examiner.*

A. J. KASPER, *Assistant Examiner.*